(12) United States Patent
Seki et al.

(10) Patent No.: US 7,559,867 B2
(45) Date of Patent: Jul. 14, 2009

(54) CONNECTION STRUCTURE FOR AUTOMATIC TRANSMISSION

(75) Inventors: Yuichi Seki, Nishio (JP); Takuya Ishii, Anjo (JP); Toshihiko Aoki, Anjo (JP); Minoru Todo, Takahama (JP); Kazutoshi Nozaki, Togo (JP); Akiharu Abe, Toyota (JP); Atsushi Honda, Seto (JP); Masafumi Kinoshita, Toyota (JP); Hirofumi Ota, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 291 days.

(21) Appl. No.: 11/434,759

(22) Filed: May 17, 2006

(65) Prior Publication Data

US 2006/0264297 A1 Nov. 23, 2006

(30) Foreign Application Priority Data

May 20, 2005 (JP) ............................. 2005-148745
Nov. 16, 2005 (JP) ............................. 2005-332099

(51) Int. Cl.
*F16H 31/00* (2006.01)
(52) U.S. Cl. ..................................................... 475/146
(58) Field of Classification Search .................. 475/146, 475/275

See application file for complete search history.

(56) References Cited

U.S. PATENT DOCUMENTS 4,690,037 A * 9/1987 Sumiya et al. ............ 92/130 R
4,860,615 A * 8/1989 Huber et al. ................ 475/146
5,343,991 A * 9/1994 Premiski et al. ............. 192/45
2005/0085332 A1 4/2005 Ziemer

FOREIGN PATENT DOCUMENTS

| JP | A 61-48616 | 3/1986 |
| JP | A 2-275151 | 11/1990 |
| JP | A-11-173343 | 6/1999 |
| JP | A-2002-126837 | 5/2002 |
| JP | A-2003-254311 | 9/2003 |
| JP | A 2005-527744 | 9/2005 |

* cited by examiner

*Primary Examiner*—David D Le
*Assistant Examiner*—Derek D Knight
(74) *Attorney, Agent, or Firm*—Oliff & Berridge, PLC

(57) ABSTRACT

A connection structure for an automatic transmission includes a drum member that includes a base portion, an outer diameter portion that extends from an outer diameter side of the base portion in an axial direction, and a collar portion that extends from an inner diameter side of the base portion in the axial direction; a base member that includes a raised portion, an outer diameter portion that extends from an outer diameter side of the raised portion in the axial direction, a boss portion that extends from an inner diameter side of the raised portion in the axial direction, and a connection portion that extends from an end of the outer diameter portion; and a ring gear of a planetary gear that includes a spline groove and a circular concave groove on an end portion of an inner peripheral face.

14 Claims, 7 Drawing Sheets

FIG.2

|  | C-1 | C-2 | C-3 | C-4 | B-1 | B-2 | F-1 |
|---|---|---|---|---|---|---|---|
| 1st | ● |  |  |  |  | (●) | ● |
| 2nd | ● |  |  |  | ● |  |  |
| 3rd | ● |  | ● |  |  |  |  |
| 4th | ● |  |  | ● |  |  |  |
| 5th | ● | ● |  |  |  |  |  |
| 6th |  | ● |  | ● |  |  |  |
| 7th |  | ● | ● |  |  |  |  |
| 8th |  | ● |  |  | ● |  |  |
| Rev1 |  |  | ● |  |  | ● |  |
| Rev2 |  |  |  | ● |  | ● |  |

(●) ENGAGEMENT DURING ENGINE BRAKE

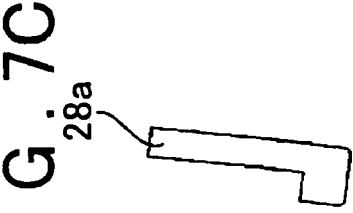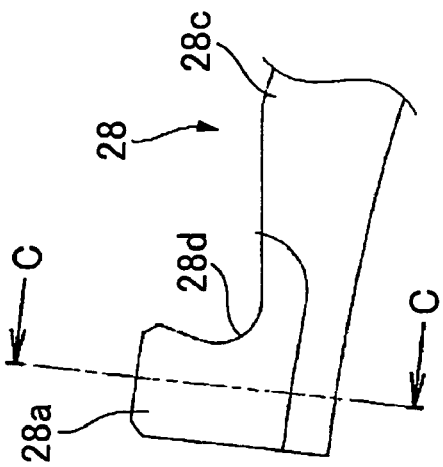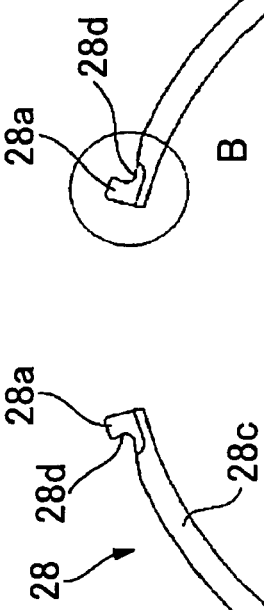

US 7,559,867 B2

CONNECTION STRUCTURE FOR AUTOMATIC TRANSMISSION

INCORPORATION BY REFERENCE

The disclosure of Japanese Patent Application No. 2005-148745, filed May 20, 2005, and Japanese Patent Application No. 2005-332099, filed Nov. 16, 2005, including the specifications, drawings and abstracts are incorporated herein by reference in their entireties.

BACKGROUND

The invention relates to a connection structure for an automatic transmission.

Automatic transmissions often use many clutch (and brake) drums in which an inner peripheral face of a clutch (and/or brake) drum member formed from a press-molded cylindrical member is outwardly engaged to a base member formed from a cylindrical member. The engaging faces are then welded by an electron beam or the like from the outside (see, for example, Japanese Patent Application Publication No. JP-A-61-48616).

In addition, a planetary gear is disposed adjacent to the clutch drum, and a connection structure is used so as to integrally fix a predetermined element of the planetary gear, such as a ring gear, to the clutch drum (see, for example, published patent application, Japanese translation of PCT international application No. 2005-527744).

The above connection structure is generally a welded structure. As such, precision may be compromised in predetermined rotation elements such as the ring gear due to warping or the like caused by the effects of heat during welding. Furthermore, other problems such as gear noise and less gear durability can occur.

Furthermore, the clutch (or brake) drum member is in spline engagement with a plurality of friction plates and has a predetermined length in the axial direction. A large bending moment (wrenching force) acts on the engaging faces in accordance with the engagement of friction plates and the like. A bending moment thus acts on the welded portion in a concentrated manner. As a result, the structure of the clutch (or brake) drum member has disadvantages in terms of strength with respect to the welded portion and a portion thereof affected by heat.

In addition, formed on an inner peripheral portion of the drum member is a boss-shaped collar portion extending toward the axial direction. The collar portion is often pressed into an outer peripheral face of the base member and an edge portion thereof may be welded. However, this involves a significant amount of surface area for the press fitting and is accompanied by a corresponding increase in the pressing load.

Moreover, the drum member may be integrally fixed to the base member as follows to reduce such a load and simplify assembly. An engaging face of the base member has a stepped structure in which only an edge portion thereof is dimensioned for press fitting, whereas other portions are set to have a slight minor diameter. Only an edge portion of the collar portion is pressed into and positioned in the base member. In such a state, the entire periphery of the edges of the collar portion and the base member are welded.

With the engaging face formed in such a stepped structure, a narrow clearance is created between an outer peripheral face of a minor diameter portion of the base member and an inner peripheral face of the collar portion. Thus, if a foreign substance were to penetrate the clearance during production, it would be impossible to eliminate the foreign substance by a washing process or the like due to the narrowness of the clearance. The contaminated connection member is subsequently assembled to an automatic transmission as a friction engagement device, after which the foreign substance may escape from the clearance during operation of the automatic transmission. The foreign substance could then cause a problem in the automatic transmission.

SUMMARY

The present invention thus provides, among other things, a connection structure for an automatic transmission that solves the problems described above by integrally fixing a drum member and a base member through press fitting, and integrally connecting the drum and a predetermined rotation element of a planetary gear using splines and snap rings.

A connection structure for an automatic transmission, according to an exemplary aspect of the invention, includes a drum member that includes a base portion, an outer diameter portion that extends from an outer diameter side of the base portion in an axial direction, and a collar portion that extends from an inner diameter side of the base portion in the axial direction; a base member that includes a raised portion, an outer diameter portion that extends from an outer diameter side of the raised portion in the axial direction, a boss portion that extends from an inner diameter side of the raised portion in the axial direction, and a connection portion that extends from an end of the outer diameter portion; and a ring gear of a planetary gear that includes a spline groove and a circular concave groove on an end portion of an inner peripheral face. A drum is structured by press fitting an inner peripheral face of the collar portion of the drum member onto an outer peripheral face of the outer diameter portion of the base member. A spline formed on an outer peripheral face of the connection portion of the base member is engaged with the spline groove of the ring gear, and a snap ring is engaged with and held in the circular concave groove.

BRIEF DESCRIPTION OF THE DRAWINGS

Various embodiments of the invention will be described with reference to the drawings, wherein:

FIG. 2 is an operation chart of the automatic transmission;

FIGS. 7A to 7C are drawings showing the snap ring according to the present invention, where FIG. 7A is a front view, FIG. 7B is an enlarged view of an end portion (portion B), and FIG. 7C is a cross-sectional view taken along a line C-C.

DETAILED DESCRIPTION OF THE PREFERRED EMBODIMENT

Figure 1:
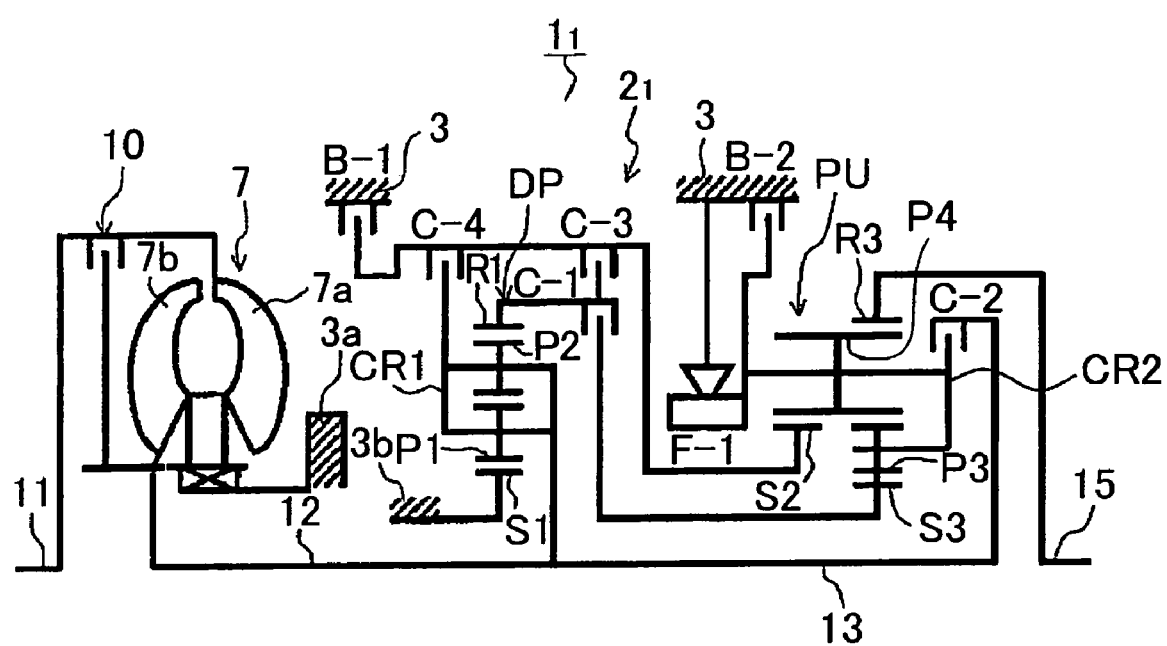
FIG. 1 is a skeleton diagram showing an automatic transmission to which the present invention is applied.

Hereinafter, an embodiment in which the present invention is applied to an automatic transmission will be explained with reference to the drawings. First, a schematic configuration of an automatic transmission $1_1$ to which the present invention can be applied will be described with reference to FIG. 1. The automatic transmission $1_1$ may be one suitable for use in an FR-type (front engine, rear-wheel drive) vehicle. Provided in the automatic transmission $1_1$ is an input shaft 11 capable of connecting to an engine (not shown). The automatic transmission $1_1$ also has a speed change mechanism $2_1$ and a torque converter 7 centered on the axial direction of the input shaft 11. Note that for this automatic transmission, "front" means toward the front of the vehicle, i.e., an engine side of the automatic transmission, and "rear" means toward the rear of the vehicle, i.e., an output shaft (a propeller shaft) side of the automatic transmission is a side opposite from the engine.

The torque converter 7 has a pump impeller 7a that is connected to the input shaft 11 of the automatic transmission $1_1$, and a turbine runner 7b to which the rotation of the pump impeller 7a is transmitted via operation fluid. The turbine runner 7b is connected to an input shaft 12 of the speed change mechanism $2_1$, with the input shaft 12 disposed on the same axis as the input shaft 11. Also provided in the torque converter 7 is a lock-up clutch 10, and when the lock-up clutch 10 is engaged through hydraulic control of a hydraulic control device (not shown), the rotation of the input shaft 11 of the automatic transmission $1_1$ is directly transmitted to the input shaft 12 of the speed change mechanism $2_1$.

The speed change mechanism $2_1$ is provided with a planetary gear (a reduction planetary gear) DP, and a planetary gear unit (a planetary gear set) PU on the input shaft 12 (and an intermediate shaft 13). The planetary gear DP is a so-called double pinion planetary gear set, and has a sun gear S1, a carrier CR1, and a ring gear R1. The carrier CR1 has a pinion P1 that meshes with the sun gear S1, and a pinion P2 that meshes with the ring gear R1. The pinions P1 and P2 also mesh together.

The planetary gear unit PU is a so-called Ravigneaux planetary gear set, and has four rotation elements: a sun gear S2, a sun gear S3, a carrier CR2, and a ring gear R3. The carrier CR2 has a long pinion P4 that meshes with the sun gear S2 and the ring gear R3, and a short pinion P3 that meshes with the sun gear S3. The long pinion P4 and the short pinion P3 also mesh together.

In the planetary gear DP, the sun gear S1 is held stationary and connected to a stator shaft 3b that is integrally fixed to a transmission case 3. The carrier CR1 is connected to the input shaft 12 and has the same rotation as that of the input shaft 12 (hereinafter called "input rotation"). Also, the carrier CR1 is connected to a fourth clutch C-4 (an input transmission clutch). The ring gear R1 has a reduced rotation, the input rotation for which has been reduced by the stationary sun gear S1 and the carrier CR1, which provides the input rotation, i.e., which rotates together with the input shaft 12. Also, the ring gear R1 is connected to a first clutch C-1 (a reduced transmission clutch) and a third clutch C-3 (a reduced transmission clutch).

In the planetary gear unit PU, the sun gear S2 is connected to a first brake B-1, and fixable to the transmission case 3. Also, the sun gear S2 is connected to the fourth clutch C-4 and the third clutch C-3. The input rotation of the carrier CR1 is inputable to the sun gear S2 via the fourth clutch C-4, and the reduced rotation of the ring gear R1 is inputable to the sun gear S2 via the third clutch C-3. In addition, the sun gear S3 is connected to the first clutch C-1, and the reduced rotation of the ring gear R1 is inputable to the sun gear S3.

The carrier CR2 is connected to a second clutch C-2, to which the rotation of the input shaft 12 is input via the intermediate shaft 13, and the input rotation for the carrier CR2 is inputable via the second clutch C-2. Also, the carrier CR2 is connected to a one-way clutch F-1 and a second brake B-2. One direction of rotation of the carrier CR2 with respect to the transmission case 3 is controlled via the one-way clutch F-1, and the rotation of the carrier CR2 is fixable via the second brake B-2. The ring gear R3 is connected to an output shaft 15 that outputs rotation to a drive wheel (not shown).

Figure 3:
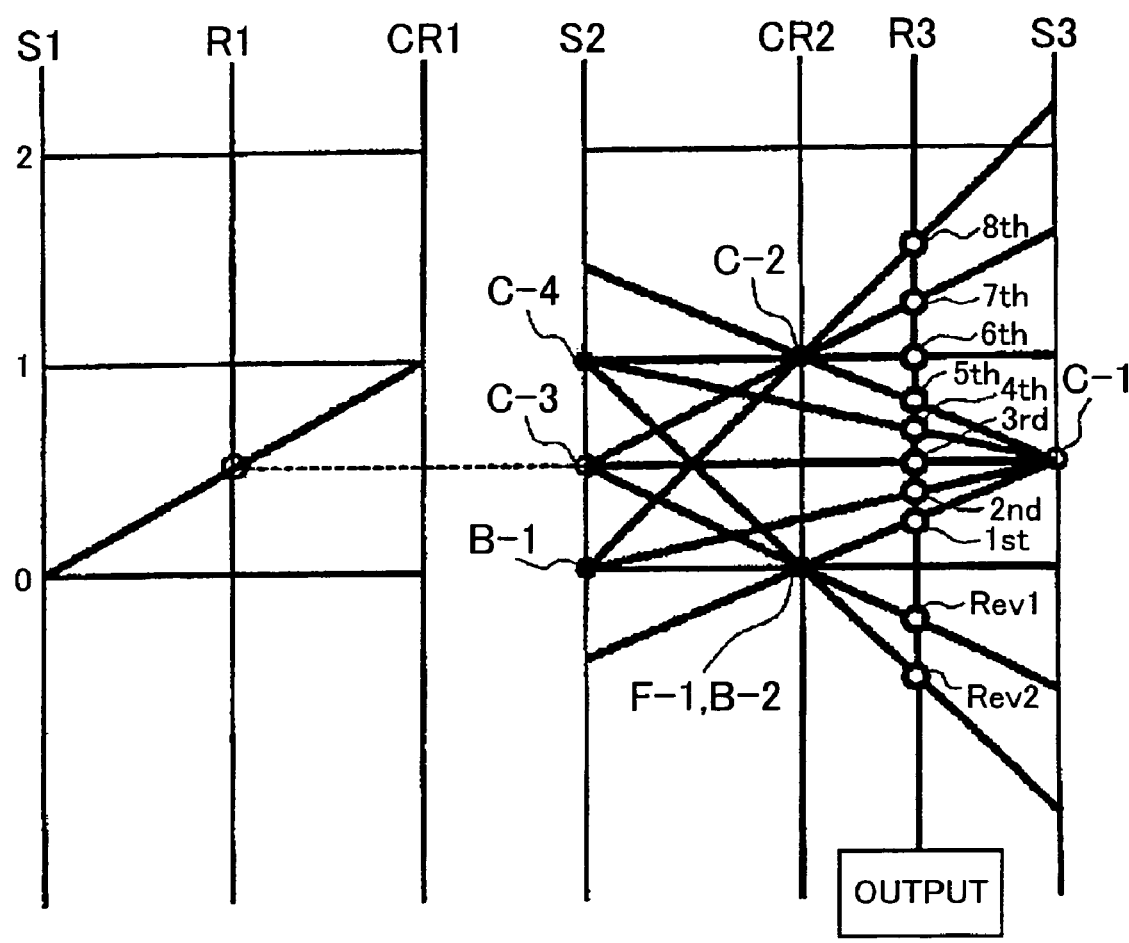
FIG. 3 is a speed diagram of the automatic transmission.

Based upon the configuration described above, the operation of the speed change mechanism $2_1$ will be explained next with reference to FIGS. 1 to 3. Note that the vertical axis and horizontal axis of a speed diagram shown in FIG. 3 denote the rotational speeds of the rotation elements (gears), and the corresponding gear ratios of the rotation elements, respectively. For the planetary gear DP part of the speed diagram, an outermost vertical axis in the horizontal direction (a left side in FIG. 3) corresponds to the sun gear S1, and the remaining vertical axes toward the right side in the figure correspond to the ring gear R1 and the carrier CR1 in that order. For the planetary gear unit PU part of the speed diagram, an outermost vertical axis in the horizontal direction (a right side in FIG. 3) corresponds to the sun gear S3, and the remaining vertical axes toward the left side in the figure correspond to the ring gear R3, the carrier CR2, and the sun gear S2 in that order.

Regarding a D (drive) range, for instance, at a forward first speed (1st), the first clutch C-1 and the one-way clutch F-1 are engaged, as shown in FIG. 2. Accordingly, the rotation of the ring gear R1, which is reduced by the stationary sun gear S1 and the carrier CR1 that provides the input rotation, is input to the sun gear S3 via the first clutch C-1 as shown in FIGS. 1 and 3. The rotation of the carrier CR2 is also controlled in one direction (a direction of normal rotation), i.e., reverse rotation of the carrier CR2 is prevented and the carrier CR2 is held stationary. Accordingly, the reduced rotation input to the sun gear S3 is output to the ring gear R3 via the stationary carrier CR2. Normal rotation acting as the forward first speed is thus output from the output shaft 15.

Note that during times of engine braking (coasting), the second brake B-2 is engaged to hold the carrier CR2, so that the forward first speed is maintained with normal rotation of the carrier CR2 prevented. At the forward first speed, reverse rotation of the carrier CR2 can also be prevented by the one-way clutch F-1 while allowing normal rotation. Therefore, the forward first speed can be smoothly achieved through automatic engagement of the one-way clutch F-1 when, for example, changing from a non-traveling range to a traveling range.

At a forward second speed (2nd), the first clutch C-1 is engaged and the first brake B-1 is held, as shown in FIG. 2. Accordingly, the rotation of the ring gear R1, which is reduced by the stationary sun gear S1 and the carrier CR1 that provides the input rotation, is input to the sun gear S3 via the first clutch C-1 as shown in FIGS. 1 and 3. Holding of the first brake B-1 also holds the sun gear S2 stationary. Accordingly, the carrier CR2 has a reduced rotation that is lower than the sun gear S3, and the reduced rotation input to the sun gear S3 is output to the ring gear R3 via the carrier CR2. Normal rotation acting as the forward second speed is thus output from the output shaft 15.

At a forward third speed (3rd), the first clutch C-1 and the third clutch C-3 are engaged, as shown in FIG. 2. Accordingly, the rotation of the ring gear R1, which is reduced by the stationary sun gear S1 and the carrier CR1 that provides the input rotation, is input to the sun gear S3 via the first clutch C-1 as shown in FIGS. 1 and 3. The reduced rotation of the ring gear R1 is also input to the sun gear S2 through engagement of the third clutch C-3. In other words, the reduced rotation of the ring gear R1 is input to both the sun gear S2 and the sun gear S3. Therefore, the planetary gear unit PU achieves a directly coupled state of reduced rotation, and the reduced rotation is output unchanged to the ring gear R3. Normal rotation acting as the forward third speed is thus output from the output shaft 15.

At a forward fourth speed (4th), the first clutch C-1 and the fourth clutch C-4 are engaged, as shown in FIG. 2. Accordingly, the rotation of the ring gear R1, which is reduced by the stationary sun gear S1 and the carrier CR1 that provides the input rotation, is input to the sun gear S3 via the first clutch C-1 as shown in FIGS. 1 and 3. The input rotation of the carrier CR1 is also input to the sun gear S2 through engagement of the fourth clutch C-4. Accordingly, the carrier CR2 achieves a reduced rotation that is faster than the sun gear S3, and the reduced rotation input to the sun gear S3 is output to the ring gear R3 via the carrier CR2. Normal rotation acting as the forward fourth speed is thus output from the output shaft 15.

At a forward fifth speed (5th), the first clutch C-1 and the second clutch C-2 are engaged, as shown in FIG. 2. Accordingly, the rotation of the ring gear R1, which is reduced by the stationary sun gear S1 and the carrier CR1 that provides the input rotation, is input to the sun gear S3 via the first clutch C-1 as shown in FIGS. 1 and 3. The input rotation is also input to the carrier CR2 through engagement of the second clutch C-2. Accordingly, a reduced rotation that is higher than the forward fourth speed is achieved due to the reduced rotation input to the sun gear S3 and the input rotation input to the carrier CR2, and is output to the ring gear R3. Normal rotation acting as the forward fifth speed is thus output from the output shaft 15.

At a forward sixth speed (6th), the second clutch C-2 and the fourth clutch C-4 are engaged, as shown in FIG. 2. Accordingly, the input rotation of the carrier CR1 is input to the sun gear S2 through engagement of the fourth clutch C-4. The input rotation of the carrier CR2 is also input via the second clutch C-2. In other words, input rotation is input to the sun gear S2 and the carrier CR2. Therefore, the planetary gear unit PU achieves a directly coupled state of input rotation, and the input rotation is output unchanged to the ring gear R3. Normal rotation acting as the forward sixth speed is thus output from the output shaft 15.

At a forward seventh speed (7th), the second clutch C-2 and the third clutch C-3 are engaged, as shown in FIG. 2. Accordingly, the rotation of the ring gear R1, which is reduced by the stationary sun gear S1 and the carrier CR1 that provides the input rotation, is input to the sun gear S2 via the third clutch C-3 as shown in FIGS. 1 and 3. The input rotation is also input to the carrier CR2 through engagement of the second clutch C-2. Accordingly, an accelerated rotation that is slightly higher than the input rotation is achieved due to the reduced rotation input to the sun gear S2 and the input rotation input to the carrier CR2, and is output to the ring gear R3. Normal rotation acting as the forward seventh speed is thus output from the output shaft 15.

At a forward eighth speed (8th), the second clutch C-2 is engaged and the first brake B-1 is held, as shown in FIG. 2. Accordingly, input rotation is input to the carrier CR2 through engagement of the second clutch C-2 as shown in FIGS. 1 and 3. Holding of the first brake B-1 also holds the sun gear S2 stationary. Accordingly, the input rotation of the carrier CR2 achieves an accelerated rotation that is higher than the forward seventh speed by the stationary sun gear S2, and the accelerated rotation is output to the ring gear R3. Normal rotation acting as the forward eighth speed is thus output from the output shaft 15.

At a reverse first speed (Rev1), the third clutch C-3 is engaged and the second brake B-2 is held, as shown in FIG. 2. Accordingly, the rotation of the ring gear R1, which is reduced by the stationary sun gear S1 and the carrier CR1 that provides the input rotation, is input to the sun gear S2 via the third clutch C-3 as shown in FIGS. 1 and 3. Holding of the second brake B-2 also holds the carrier CR2 stationary. Accordingly, the reduced rotation input to the sun gear S2 is output to the ring gear R3 via the stationary carrier CR2. Reverse rotation acting as the reverse first speed is thus output from the output shaft 15.

At a reverse second speed (Rev2), the fourth clutch C-4 is engaged and the second brake B-2 is held, as shown in FIG. 2. Accordingly, the input rotation of the carrier CR1 is input to the sun gear S2 through engagement of the fourth clutch C-4. Holding of the second brake B-2 also holds the carrier CR2 stationary. Accordingly, the input rotation input to the sun gear S2 is output to the ring gear R3 via the stationary carrier CR2. Reverse rotation acting as the reverse second speed is thus output from the output shaft 15.

Note that in a P (parking) and N (neutral) range, for example, the first clutch C-1, the second clutch C-2, the third clutch C-3, and the fourth clutch C-4 are all released. Accordingly, the connection between the carrier CR1 and the sun gear S2 is severed, as well as between the ring gear R1, the sun gear S2 and the sun gear S3. That is, the planetary gear DP and the planetary gear unit PU are disconnected. The connection between the input shaft 12 (intermediate shaft 13) and the carrier CR2 is also severed. Thus, the transmission of driving force between the input shaft 12 and the planetary gear unit PU is severed, i.e., there is no transmission of driving force from the input shaft 12 to the output shaft 15.

Figure 4:
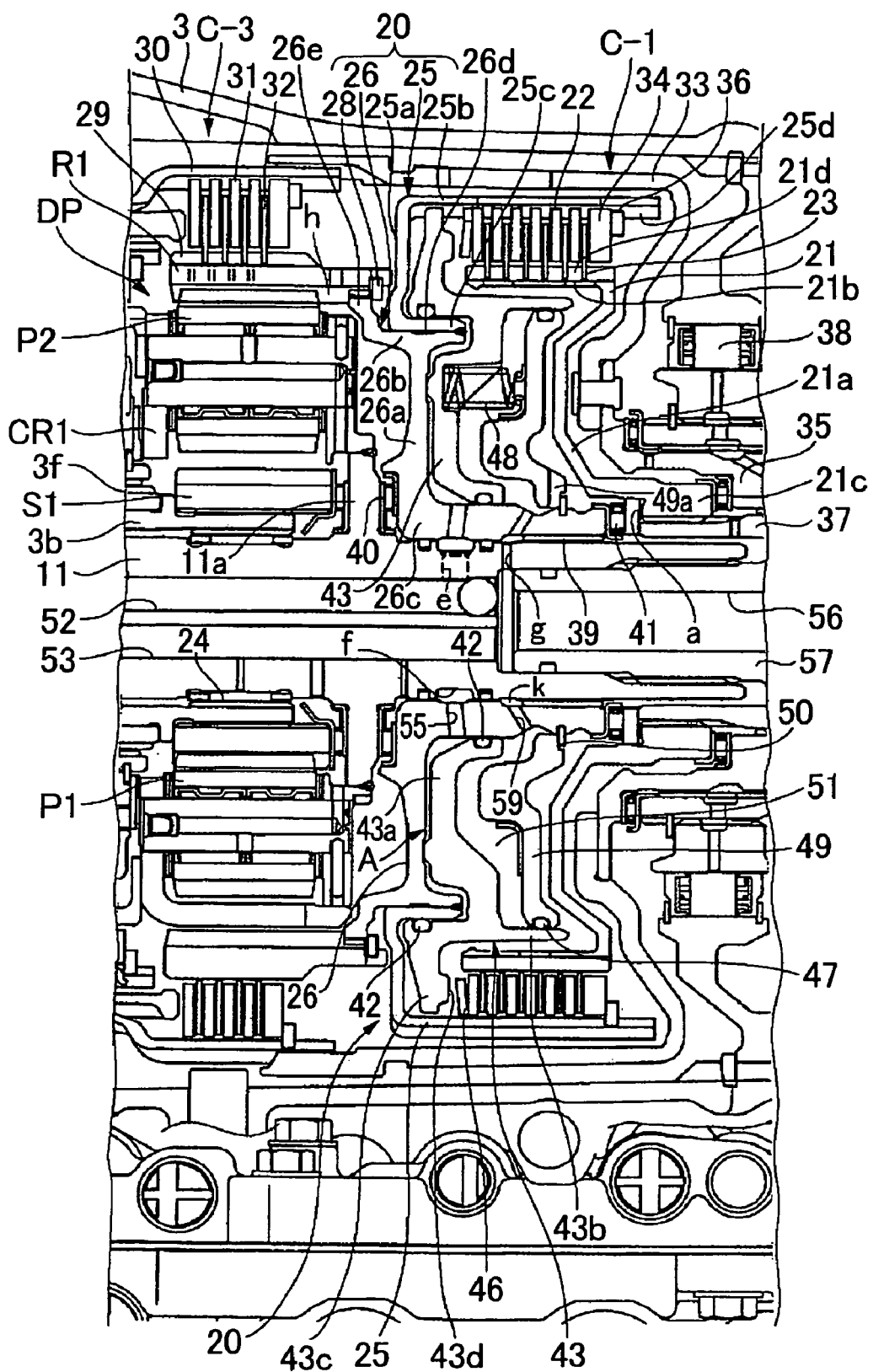
FIG. 4 is an enlarged cross-sectional view showing a part of the automatic transmission.

Next, the first clutch C-1, which is a friction engagement device according to the present invention, will be described in detail with reference to FIG. 4. The first clutch C-1, as mentioned earlier, is a multi-plate clutch that can connect and disconnect the ring gear R1 of the reduction planetary gear DP and the sun gear S3 (not shown in FIG. 4) of the planetary gear unit PU. The first clutch C-1 has a clutch drum 20, a clutch hub 21, in addition to clutch plates (outer friction plates) 22 and clutch discs (inner friction plates) 23 provided between the drum and the hub.

Figure 5:
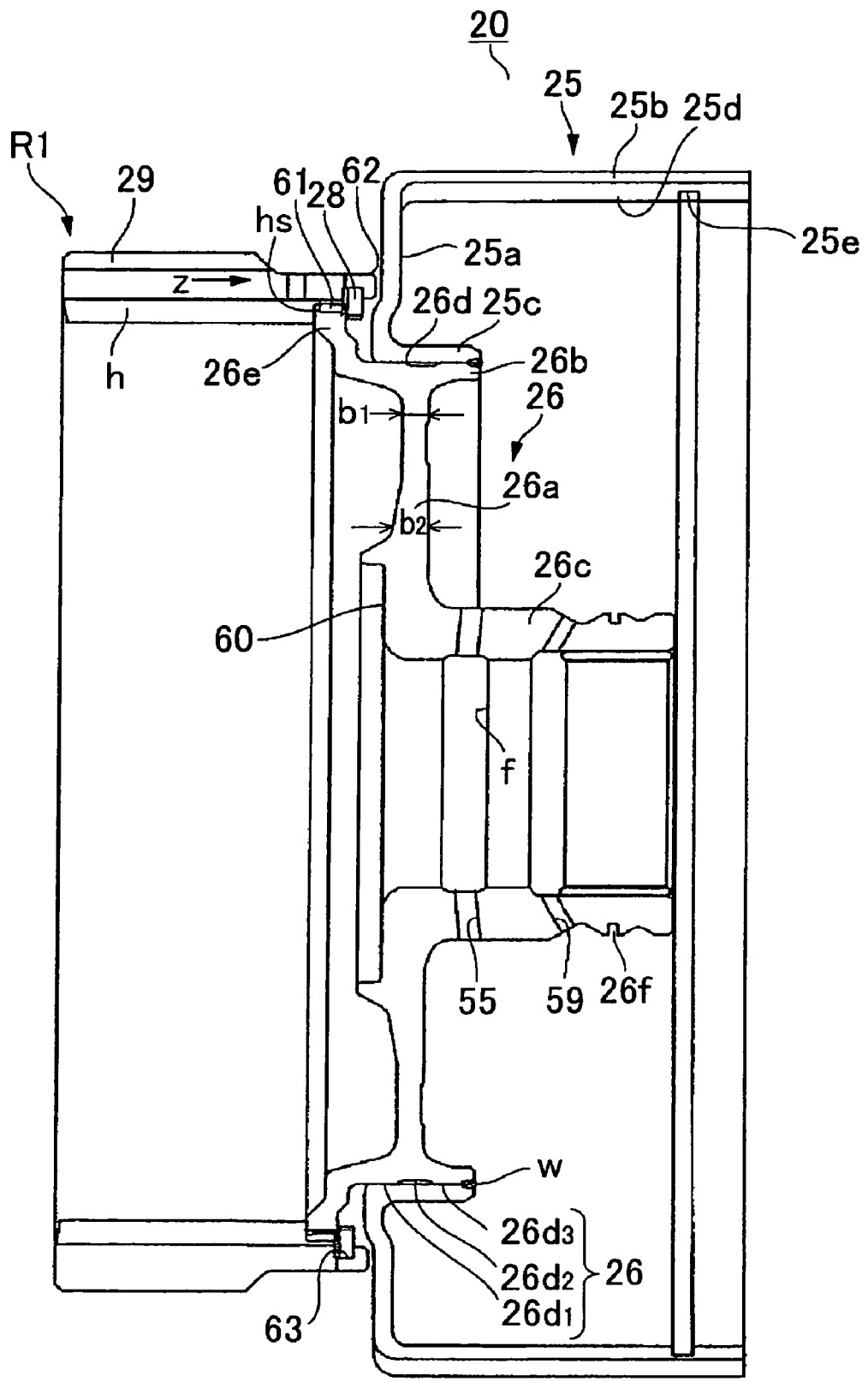
FIG. 5 is a cross-sectional view showing a clutch drum, in addition to a connection structure between the drum and a predetermined rotation element of a planetary gear, according to the present invention.

In the clutch drum 20, as shown in detail in FIG. 5, a drum member 25 and a base member 26 are fixedly attached. The drum member 25 is made from an integral part press-formed (i.e., press-forming) so as to have a C-shape (as shown in FIG. 5). Furthermore, the drum member 25 includes: a base portion 25a, an outer diameter portion 25b that extends rearward from an outer diameter side of the base portion in the axial direction, and a collar portion 25c that extends rearward from an inner diameter side of the base portion 25a in the axial direction. The base member 26 includes: a raised portion 26a that forms a cylinder bottom face, an outer diameter portion 26b that extends rearward from an outer diameter side of the raised portion 26a, and a boss portion 26c that extends rearward from an inner diameter side of the raised portion 26a. In addition, the outer diameter portion 26b has an engaging face 26d that engages with the drum member 25 at an outer peripheral face thereof, and has a connection portion 26e that extends from a front end in the axial direction toward an outer diameter direction.

As described earlier, the reduction planetary gear DP is accommodated in the transmission case 3 along with the rest of the speed change mechanism 21. Included in the reduction planetary gear DP are: the sun gear S1, the ring gear R1, and the carrier CR1. The carrier CR1 also supports the first pinion P1 that meshes with the sun gear S1, and the second pinion P2 that meshes with the ring gear R1 and with the first pinion P1. The sun gear S1 is in spline engagement with a stator shaft $3b$, which is pressed into an inner periphery of a pump cover that is integral with the transmission case 3. The carrier CR1 is fixedly attached to a collar portion $11a$ of the input shaft 11, and the input shaft 11 is rotatably supported on the stator shaft $3b$, which is a fixed member, via a needle bearing 24. Regarding the ring gear R1, teeth h on an inner peripheral face thereof are engaged with the connection portion $26e$ of the base member 26, and a snap ring 28 is fitted into a concave groove formed on the ring gear R1 so as to clamp the base member 26. Furthermore, splines 29 are formed on an outer peripheral face of the ring gear R1. Between the splines 29 and a drum 30 rotatably supported on an oil pump boss portion $3f$ (not particularly shown), clutch plates (outer friction plates) 31 and clutch discs (inner friction plates) 32 are respectively engaged so as to structure the third clutch C-3. The drum 30 is in spline engagement with a connection drum member 33 via their respective ends, and both are integrally connected in the direction of rotation. The connection drum member 33 extends rearward so as to cover the first clutch C-1. The connection drum member 33 is also joined with a connection boss member 35 by rivets at a rear portion of the C-1 clutch hub 21. An end of the connection boss member 35 is connected to the second sun gear S2 (see FIG. 1). Note that reference numeral 38 denotes the one-way clutch that prevents rotation in one direction of the carrier CR2 (see FIG. 1) in the planetary gear unit PU (not shown).

Included in the clutch hub 21 are: a raised portion $21a$, an outer diameter portion $21b$ that extends forward from an outer diameter side of the raised portion in the axial direction, and a boss portion $21c$ that extends rearward from an inner diameter side of the raised portion in the axial direction. A multi-plate wet clutch is structured as follows. The clutch discs 23 and the clutch plates 22 are alternately disposed. The clutch discs 23 are engaged with splines $21d$ formed on the outer diameter portion $21b$, and the clutch plates 22 are engaged with splines $25d$ formed on an inner peripheral face of the outer diameter portion $25b$ of the clutch drum 20. Moreover, a snap ring 36 held by the outer diameter portion $25b$ of the drum member 25 clamps a backup plate 34 that is disposed at ends of the clutch discs 23 and the clutch plates 22. The clutch hub boss portion $21c$ has a stepped structure, and splines are formed on a minor diameter portion thereof. Also, an end of the boss portion $21c$ is engaged with a hollow intermediate shaft 37 that is connected with the third sun gear S3 (see FIG. 1).

The base member boss portion $26c$ of the C-1 clutch drum 20 is rotatably supported on the input shaft 11 via a bushing 39 or the like. Also, the boss portion $26c$ is positioned in the axial direction such that a thrust bearing 40 is disposed between an end of the boss portion $26c$ in the axial direction and the collar portion $11a$ of the input shaft 11, and a thrust bearing 41 is disposed between another end of the boss portion $26c$ in the axial direction and a step portion a of the clutch hub boss portion $21c$. A hydraulic servo A for the clutch C-1 is structured on the drum 20 as follows. The base member raised portion $26a$ acts as a cylinder bottom face. An outer peripheral face of the collar portion $25c$ of the drum member 25 and an outer peripheral face of the boss portion $26c$ of the base member 26 act as sliding faces. A fluid-tight piston member 43 is fitted between O-rings 42, 42. The piston member 43 is formed with a piston portion $43a$ that opposes the raised portion $26a$ forming the cylinder bottom face, a cylindrical portion $43b$ that extends laterally toward the axial direction from an outer diameter portion of the piston portion $43a$, and a piston rod portion $43c$ that extends from a front end of the cylindrical portion $43b$ toward an outer diameter side. In addition, the O-rings 42, 42 are respectively fitted in a concave groove formed on an inner peripheral face of the cylindrical portion $43b$ and in a concave groove formed on an inner peripheral face of the piston portion $43a$.

An end of the piston rod portion $43c$ is engaged with the splines $25d$ of the outer diameter portion $25b$ in the clutch C-1 drum member, and the piston rod portion $43c$ is engaged such that the clutch drum 20 and the piston member 43 integrally rotate. Also, a projection portion $43d$, which partially projects toward a side face of the piston rod portion $43c$, opposes a base end side of the respective friction plates 22, 23 of the first clutch C-1 via a cushion plate 46. A fluid-tight cancel plate 49 is fitted to the cylindrical portion $43b$ on a back face side of the piston portion $43a$ via an O-ring 47. The cancel plate 49 forms a cancel oil chamber 51 with a back face of the piston that is clamped using a snap ring 50 held by the base member boss portion $26c$. Provided energized between the cancel plate 49 and the back face of the piston member 43 are a plurality of circular return springs 48.

In the first clutch C-1, the piston rod portion $43c$ is formed rising in the outer diameter direction from the piston portion $43a$. Furthermore, the cylindrical portion $43b$ is located on the inner diameter side of the outer diameter portion $21b$ of the clutch hub 21, and the cylindrical portion $43b$ forms the cancel oil chamber 51 with the cancel plate 49. Therefore, a plurality of the friction plates 22, 23 can be arranged on the outer diameter side of the piston portion $43a$ and the cancel oil chamber 51, and it is possible to structure a compact clutch C-1 including the hydraulic servo A, which is particularly compact in the axial direction.

The input shaft 11 is formed with oil passages 52, 53. Operating oil pressure is supplied to the oil passage 52. Additionally, operating oil pressure is supplied to the hydraulic servo A via a lateral oil passage e of the input shaft 11 and an oil-tight circular groove f defined by an O-ring, and also via an oil gallery 55 formed on the boss portion $26c$ of the base member 26. Lubrication oil pressure is supplied to the oil passage 53. The oil passage 53 is in communication with an oil passage 57 of the intermediate shaft 56 that is in spline engagement with the input shaft 11. Furthermore, the oil passage 53 discharges from an oil gallery 59 formed on the base member boss portion $26c$ to the cancel oil chamber 51 via a lateral oil passage g and an oil chamber k. A notch $49a$ is formed on an inner diameter portion of the cancel plate 49, and overflowing oil from the cancel oil chamber 51 is guided to the first clutch C-1.

Next, the C-1 clutch drum 20, as well as a connection structure for the drum 20 and a ring gear R according to the present invention will be described in detail with reference to FIG. 5. As explained above, the clutch drum 20 is formed fixedly attached to the drum member 25 and the base member 26. The outer peripheral face of the outer diameter portion $26b$ of the base member 26 acts as the engaging face $26d$. A central portion of the engaging face $26d$ is slightly cut in a circular shape so as to form a hollow portion $26d_2$. Both front and rear sides thereof form pressed portions $26d_1$, $26d_3$ having a press fit dimension. The inner peripheral face of the collar portion $25c$ of the drum member 25 is fitted to the engaging face $26d$ of the base member 26. Only the pressed portions $26d_1$, $26d_3$ are pressed and in contact at this time, and the hollow portion $26d_2$ has a slight clearance with the inner peripheral face of the inner diameter portion $25c$. Thus, when the drum member 25 is pressed onto the base member 26, a relatively wide surface area is involved in such press fitting based on the drum member collar portion $25c$. However, an axial length of the pressed portions $26d_1$, $26d_3$ is relatively short, and press fitting can be achieved with a relatively small pressing load. In other words, both end portions in an axial direction of engaging faces of an inner peripheral face of the collar portion 25c of the drum member 25 and an outer peripheral face of the outer diameter portion 26b of the base member 26 are designated as a press fit dimension, and a clearance is formed by the hollow portion $26d_2$ between both end portions.

The drum member 25 and the base member 26 are positioned by press fitting with rearward positions of the collar portion 25c and the cylindrical portion 26b aligned. In such a state, the collar portion 25c and the cylindrical portion 26b are welded at the aligned end faces (w). Accordingly, the drum member 25 and the base member 26 are fixedly attached, and there is a clearance between central portions of the engaging faces thereof due to the hollow portion $26d_2$. However, the clearance is obstructed by the pressed portions $26d_1$, $26d_3$ on both sides thereof such that no foreign substances or the like penetrate.

The raised portion 26a of the base member 26 is formed into a circular disc shape whose outer diameter side thickness ($b_1$) is less than an inner diameter side thickness ($b_2$), i.e., $b_1 < b_2$. Note that in FIG. 5, reference numeral 25e denotes a circular concave groove for engaging the snap ring 36 used to hold the backup plate 34, and reference numeral 26f denotes a circular concave groove for engaging the snap ring 50 used to hold the cancel plate 49. Moreover, reference numeral 60 denotes a concave portion for accommodating the thrust bearing 40.

The clutch drum 20 is arranged adjacent to the planetary gear DP, and is integrally connected with the ring gear R1, which is a predetermined rotation element of the planetary gear. Teeth h of the ring gear R1 extend in the axial direction, and form spline grooves hs on a clutch drum side. In addition, an end portion of the connection portion 26e of the base member 26 is formed into splines 61 capable of engaging with the spline grooves hs.

Figure 6:
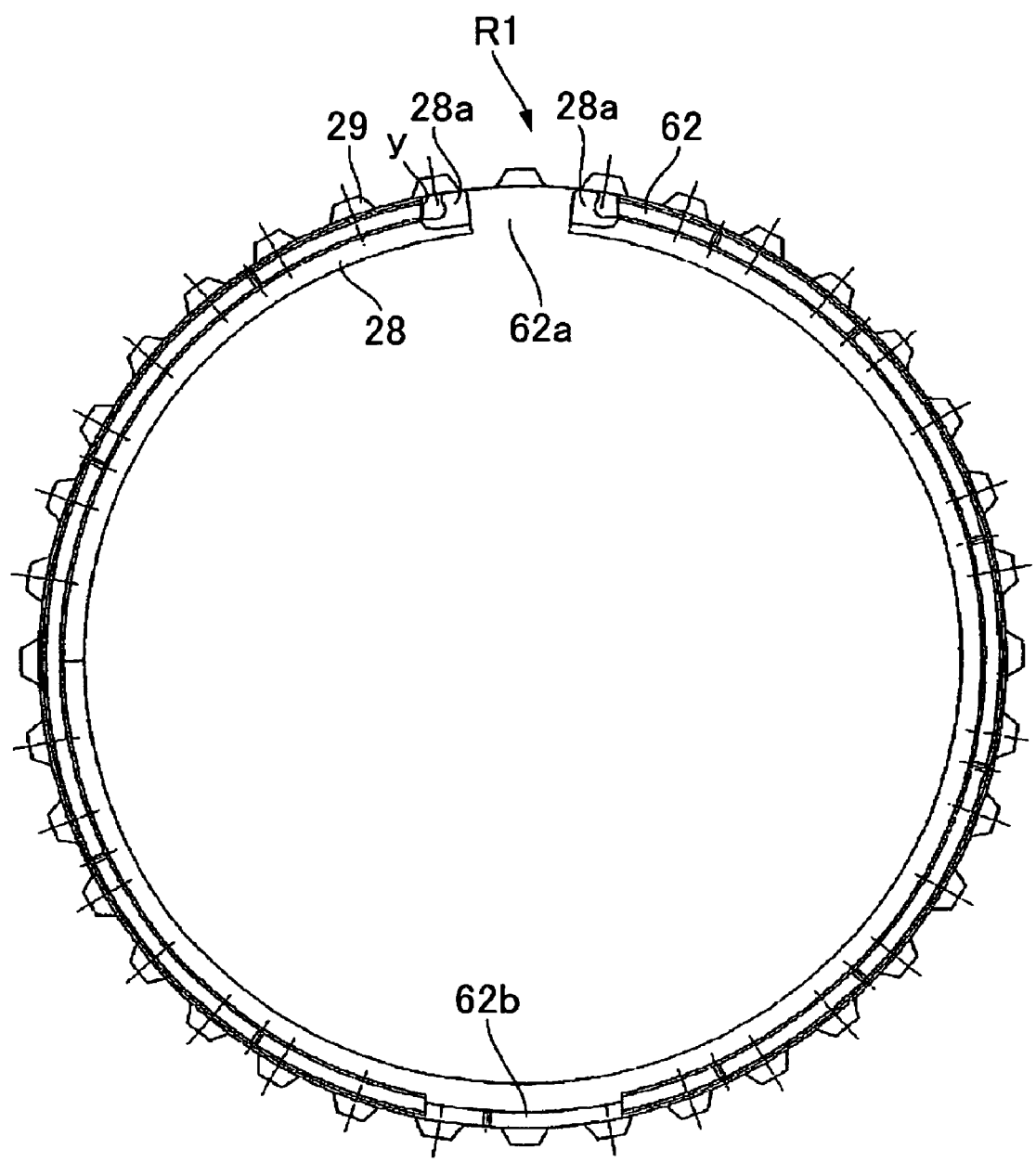
FIG. 6 is an end view showing a state in which snap rings of a predetermined rotation element (a ring gear) are engaged according to the present invention.

A clutch-drum-side end of the ring gear R1 forms a circular portion 62 that projects in the axial direction. An inner peripheral face of the circular portion 62 is adjacent to the spline grooves hs to form a circular concave groove 63. The circular portion 62, as shown in FIG. 6, is notched at two locations so as to form notch portions 62a, 62b along a periphery thereof that are spaces where the circular portion 62 does not exist.

The snap ring 28 fitted in the circular concave groove 63 is C-shaped when viewed from the front, as shown in FIGS. 7A-7C, and both end portions thereof have tabs 28a, 28a that extend toward the outer diameter direction. A side face of the tab portions is cut so as to have less thickness than a remaining portion (body portion) 28c. Additionally, a concave portion 28d is formed adjacent to the tab 28a and between the tab 28a and the body portion 28c.

More specifically with respect to the clutch drum 20, the drum member 25 and the base member 26 are fixedly attached by pressing the inner peripheral face of the collar portion 25c onto the engaging face 26d of the outer diameter portion 26b. Consequently, the effect of heat from welding is small. In addition, the clutch drum 20 and the ring gear R1 are integrally connected such that the rotational direction thereof is controlled by spline engagement of the portions hs, 61 of the connection portion 26e, and the axial direction thereof is controlled by engagement with the circular concave groove 63 of the snap ring 28. Accordingly, heat from welding has little effect on the connection between the clutch drum 20 and the ring gear R1, thus making it possible to maintain the high precision of the ring gear R1.

Given the need to structure the clutch drum and the ring gear R1 compact for mounting in the vehicle, both are arranged so as to minimize clearances as much as possible, and there is no space to manipulate the snap ring 28 from the axial direction. Accordingly, the circular portion 62 that projects toward the clutch drum side of the ring gear R1 is formed with the notch portions 62a, 62b. A pair of the tabs 28a, 28a of the snap ring 28 projecting in the outer diameter direction is sandwiched in the circular portion 62 via one of the notch portions 62a, 62b, and the diameter of the snap ring 28 is reduced. In such a state, the ring gear R approaches the connection portion 26e with the spline grooves hs of the ring gear R engaged with the splines 61 of the connection portion 26e, such that the snap ring 28 aligns with the circular concave groove 63. The snap ring 28 then engages with the circular concave groove 63 following cancellation of the diameter reduction of the snap ring 28 by manipulating the tab 28a from the outer diameter direction.

At this time, it is possible to visually confirm that the snap ring 28 is positioned in alignment with the circular concave groove 63 via another notch portion 62b of the circular portion 62, thereby enabling easy and reliable engagement of the snap ring 28. Also, the concave portion 28d adjacent to the tab 28a of the snap ring 28 is used to prevent interference with an end face y of the circular portion 62 (i.e., portion) facing the notch portion 62a of the circular portion 62. For instance, the tab 28a may come in contact with the end face y while the snap ring 28 rotates relative to the concave groove 63. But even in such cases, the end face y contacts a portion adjacent and diagonal to the tab 28a and the body portion 28c such that there is no force acting in a direction reducing the diameter of the snap ring 28.

Next, the operation of the first clutch C-1 (friction engagement device) portion according to the present invention will be explained. In a state where hydraulic pressure is not supplied to the hydraulic servo A, the piston member 43 achieves the state shown in FIG. 4 due to the return spring 48, and the projection portion 43d of the piston portion 43a separates from the clutch plates 21, 22, 46, whereby the first clutch C-1 is released. If a predetermined hydraulic pressure is supplied to the hydraulic servo A via the oil passages 52, e, f, 55 in this state, then the piston member 43 moves against the return spring 48 such that the piston rod projection portion 43d closely contacts and presses against the plurality of clutch plates 22 and clutch discs 23 via the cushion plate 46. Accordingly, the first clutch C-1 is connected, and the rotation of the ring gear R1 is transmitted to the third sun gear S3 via the clutch drum 20, the clutch plates 22, 23, the clutch hub 21, and the hollow intermediate shaft 37.

Furthermore, the pressing force on the clutch plate by the piston portion 43a acts on an end portion of the outer diameter portion 25b of the drum member 25 via the backup plate 34 and the snap ring 36. Consequently, the drum member 25 acts as a bending moment (wrenching force) on the engaging face 26d, which is a face of the base member 26 that engages therewith. However, the drum member 25 has the collar portion 25c of a predetermined length in the axial direction, and front and rear portions thereof are pressed to engage with the pressed portions $26d_1$, $26d_3$. Therefore, the bending moment does not become a concentrated load and is instead dispersed and reliably supported.

Meanwhile, the planetary gear DP is formed from helical gears, and the ring gear R1 generates a thrust force in a rightward direction (arrow z direction) in FIG. 5 based upon the transmission of driving force by the planetary gear DP. The thrust force acts on the raised portion 26a of the base member 26 via the stepped portion of the spline grooves hs and the connection portion 26e. However, the raised portion 26a of the base member 26 has a thickness that increase toward the inner diameter side ($b_1 > b_2$). Therefore, a structure with the strength to withstand the above-mentioned clutch pressing force and the thrust force caused by the helical gear of the ring gear R1 can be achieved. As a consequence, problems such as damage caused by a load concentrated on a welded portion w can be prevented. Moreover, the drum member 25 can be reliably supported by the base member 26 with high precision. Thus, even if a great force occurs when engaging the clutch, the drum member 25 can be smoothly moved towards the plurality of clutch plates 22, 23 for highly precise engagement.

Furthermore, the outer diameter side of the piston member 43 slides toward the outer peripheral face of the collar portion 25c. Due to the reliable support of the clutch drum member 25 as described above, the collar portion 25c acting as the sliding face is held in position with high precision so as to maintain the smooth movement of the piston member 43. In addition, the piston surface area can be increased by an amount corresponding to the thickness of the drum member collar portion 25c and the base member outer diameter portion 26b, whereby greater clutch pressing force can be achieved.

To disconnect the clutch through the release of hydraulic pressure in the hydraulic servo A, the piston member 43 returns due to the return spring 48 and a centrifugal force that acts on oil in the cancel oil chamber 51. At this time, the piston member 43 smoothly slides against the collar portion 25c that is held in position with high precision and the boss portion 26c so as to quickly release the clutch.

Note that the above embodiment has the pressed portions $26d_1$, $26d_3$ and the hollow portion $26d_2$ formed on the outer peripheral face of the outer diameter portion 26b of the base member 26. However, the pressed portions $26d_1$, $26d_3$ and the hollow portion $26d_2$ may also be formed on the inner peripheral face of the collar portion 25c of the drum member 25. Furthermore, the present invention is applied to the first clutch C-1 as a friction engagement device, but it may also be applied to other clutches or brakes, and may further be applied as a friction engagement device for other automatic transmissions. In addition, a ring gear was designated as the predetermined rotation element of the planetary gear to be connected to the clutch (or brake) drum. However, the present invention is not particularly limited by this, and other predetermined rotation elements such as a carrier may be used instead.

According to an exemplary aspect of the present invention, a drum is structured by pressing to integrally fix a drum member and a base member, and the drum and a ring gear of a planetary gear are connected through splines and a snap ring. This can therefore reduce the effect of heat from welding, increase the precision of the ring gear and the drum, and prevent noise, in addition to lengthening the life of the parts.

According to a second exemplary aspect of the present invention, the snap ring can be engaged and disengaged from a circular concave groove by manipulating a tab that extends toward an outer diameter direction of the snap ring through a notch portion of a circular portion. Accordingly, there is no need for a space in the axial direction for manipulating the snap ring, thus making it possible to arrange the planetary gear and the drum close together in the axial direction for a more compact automatic transmission.

According to a third exemplary aspect of the present invention, while the circular portion has the notch portion, a concave portion of the snap ring prevents interference of an end face of the notch portion with a portion adjacent to the tab. Therefore, it is possible to prevent the tab portion from overlapping the end face of the notch portion and producing a force in a direction that reduces the diameter of the snap ring.

According to a fourth exemplary aspect of the present invention, the circular portion has at least two notch portions. Therefore, an operation to reduce the diameter of the snap ring can be performed through one notch, while engagement of the snap ring to the circular concave portion can be confirmed via the other notch portion. Consequently, operations to engage and disengage the snap ring can be easily and reliably performed.

According to a fifth exemplary aspect of the present invention, the drum member is formed with an outer diameter portion having splines engaged with friction plates. A collar portion is formed on the outside of the outer diameter portion and extends toward an inner diameter side in the axial direction. The collar portion engages with an outer peripheral face of an outer diameter portion of the base member. Both end portions in the axial direction of such engaging faces are designated as a press fit dimension, and a clearance is formed at a portion therebetween. Therefore, even if a large bending moment acts on the drum member due to a large pressing force for engaging the friction plates, the base member is supported by the pressing of both end portions of the collar portion. Consequently, the drum member can be supported by the base member in a stable manner and with a high degree of supporting precision, thus making it possible to maintain the smooth movement of the friction plates and the performance of the friction engagement device over a long period of time.

In addition, the press fit dimension when pressing the collar portion of the drum member onto the outer diameter portion of the base member is both end portions separated in the axial direction, which reduces the pressing load and simplifies assembly. Also, the clearance is obstructed by pressed portions on both sides thereof. Consequently, problems related to foreign substances can be eliminated, such as the penetration of foreign substances or the like that are subsequently released after assembly to an automatic transmission.

According to a sixth exemplary aspect of the present invention, the collar portion of the drum member is supported on the base member by the pressed portions separated in the axial direction. Therefore, a load based on a large bending moment from the drum member can be prevented from concentrating on a welded portion of the drum member and the base member, thus preventing any deterioration in the durability of the welded portion and a portion thereof affected by heat.

According to a seventh exemplary aspect of the present invention, the drum member can be easily manufactured at low costs through the press forming of an integral part. In addition, the outer diameter portion of the base member is formed with a pressed portion having the press fit dimension and a hollow portion, which further facilitates manufacturing.

According to an eighth exemplary aspect of the present invention, a clutch hub is provided and the drum is applied to a clutch drum. Therefore, the precision and strength of the clutch drum can be maintained over a long period of time regardless of large bending moments acting on the drum member.

According to a ninth exemplary aspect of the present invention, a hydraulic servo is structured by fitting a drum acting as a cylinder with a piston, where an outer peripheral face of the collar portion of the drum member acts as a sliding face on an outside diameter side of a piston member. Therefore, a large surface area can be secured for bearing the pressure of the piston, and a large engagement force can be applied to the friction plates. Consequently, operation of the friction engagement device can be performed in a stable and reliable manner.

According to a tenth exemplary aspect of the present invention, a piston rod is provided on an outer diameter side of the piston portion, and a cancel plate is provided spanning a cylindrical portion and a boss portion. This in turn provides a cancel oil chamber on a back face side of the piston. Therefore, a plurality of the friction plates operated by the piston rod are disposed on an outer diameter side of the piston portion and the cancel oil chamber. It is thus possible to structure a compact friction engagement device including the hydraulic servo, which is particularly compact in the axial direction.

According to an eleventh exemplary aspect of the present invention, the raised portion of the base member is formed such that a thickness on an inner diameter side is greater than a thickness on an outer diameter side. Therefore, a structure with the strength to withstand a pressing force caused by the drum member and a thrust force caused by a predetermined rotation element such as a ring gear can be achieved.

What is claimed is:

1. A connection structure for an automatic transmission, comprising:
   a drum member that includes a base portion, an outer diameter portion that extends from an outer diameter side of the base portion in an axial direction, and a collar portion that extends from an inner diameter side of the base portion at a first end of the collar portion in the axial direction;
   a base member that includes a raised portion, an outer diameter portion that extends from an outer diameter side of the raised portion in the axial direction, a boss portion that extends from an inner diameter side of the raised portion in the axial direction, and a connection portion that extends from a first end of the outer diameter portion; and
   a ring gear of a planetary gear that includes a spline groove and a circular concave groove on an end portion of an inner peripheral face, wherein:
     a drum is structured by press fitting an inner peripheral face of the collar portion of the drum member onto an outer peripheral face of the outer diameter portion of the base member,
     a second end of the outer diameter portion of the base member is aligned with a second end of the collar portion of the drum member, and the second end of the outer diameter portion and the second end of the collar portion are welded together,
     a spline formed on an outer peripheral face of the connection portion of the base member is engaged with the spline groove of the ring gear, and a snap ring is engaged with and held in the circular concave groove,
     a circular portion, including the circular concave groove, of the ring gear has a notch portion in at least one position along a periphery thereof,
     the snap ring includes tabs extending toward an outer diameter direction on both end portions thereof, and
     the tabs are positioned in the notch portion and tabs are manipulated from an outer diameter direction of the notch portion such that the snap ring can be engaged and disengaged from the circular concave groove.

2. The connection structure for the automatic transmission according to claim 1, wherein the raised portion of the base member is formed such that a thickness on an inner diameter side is greater than a thickness on an outer diameter side.

3. The connection structure for the automatic transmission according to claim 1, wherein the snap ring includes concave portions, which are adjacent to the tabs and which prevent interference with a portion facing the notch portion of the circular portion.

4. The connection structure for the automatic transmission according to claim 3, wherein:
   the circular portion is formed with at least two notch portions, and
   at least one of the tabs of the snap ring can be manipulated through one notch portion, and fitting of the snap ring into the circular concave groove can be confirmed through the other notch portion.

5. The connection structure for the automatic transmission according to claim 1, wherein
   the circular portion is formed with at least two notch portions, and
   at least one of the tabs of the snap ring can be manipulated through one notch portion, and fitting of the snap ring into the circular concave groove can be confirmed through the other notch portion.

6. A connection structure for an automatic transmission, comprising:
   a drum member that includes a base portion, an outer diameter portion that extends from an outer diameter side of the base portion in an axial direction, and a collar portion that extends from an inner diameter side of the base portion at a first end of the collar portion in the axial direction;
   a base member that includes a raised portion, an outer diameter portion that extends from an outer diameter side of the raised portion in the axial direction, a boss portion that extends from an inner diameter side of the raised portion in the axial direction, and a connection portion that extends from a first end of the outer diameter portion; and
   a ring gear of a planetary gear that includes a spline groove and a circular concave groove on an end portion of an inner peripheral face, wherein:
     a drum is structured by press fitting an inner peripheral face of the collar portion of the drum member onto an outer peripheral face of the outer diameter portion of the base member,
     a second end of the outer diameter portion of the base member is aligned with a second end of the collar portion of the drum member, and the second end of the outer diameter portion and the second end of the collar portion are welded together,
     a spline formed on an outer peripheral face of the connection portion of the base member is engaged with the spline groove of the ring gear, and a snap ring is engaged with and held in the circular concave groove, and
     both of the first end portion and the second end portion in the axial direction of engaging faces of an inner peripheral face of the collar portion of the drum member and an outer peripheral face of the outer diameter portion of the base member are designated as a press fit dimension, and a clearance is formed at a portion between both the first end portion and the second end portion.

7. The connection structure for the automatic transmission according to claim 6, wherein:
   the drum member is made from an integral part by press-forming, and
   the engaging face on the outer peripheral face of the outer diameter portion of the base member is formed with pressed portions having the press fit dimension at both the first end portion and the second end portion in the axial direction, and formed with a hollow portion whose diameter is smaller than the pressed portions at a portion between the pressed portions.

8. The connection structure for the automatic transmission according to claim 6, wherein the raised portion of the base member is formed such that a thickness on an inner diameter side is greater than a thickness on an outer diameter side.

9. The connection structure for the automatic transmission according to claim 6, wherein:
- a clutch hub is disposed on an inner diameter side of the outer diameter portion of the drum member, and
- a plurality of friction plates are alternately engaged and arranged between splines formed on an outer peripheral surface of an outer diameter portion of the clutch hub and splines formed on an inner peripheral face of the outer diameter portion of the drum member.

10. The connection structure for the automatic transmission according to claims 9, wherein the raised portion of the base member is a cylinder bottom face, an outer peripheral face of the collar portion of the drum member and an outer peripheral face of the boss portion of the base member act as sliding faces, and a piston member is fluid-tightly fitted into the drum member so as to structure a hydraulic servo for the plurality of friction plates.

11. The connection structure for the automatic transmission according to claim 10, wherein:
- the piston member includes a piston portion structuring the hydraulic servo, a piston rod portion that extends from the piston portion toward an outer diameter side, and a cylindrical portion that extends from an outer diameter side of the piston portion toward a back face side of the piston portion in the axial direction, and
- a cancel plate is disposed on the cylindrical portion in a fluid-tight state and held by the boss portion of the base member so as to form a cancel oil chamber on the back face of the piston portion.

12. The connection structure for the automatic transmission according to claim 9, wherein the raised portion of the base member is formed such that a thickness on an inner diameter side is greater than a thickness on an outer diameter side.

13. The connection structure for the automatic transmission according to claim 1, wherein:
- the drum member is made from an integral part by press-forming, and
- an engaging face on the outer peripheral face of the outer diameter portion of the base member is formed with pressed portions having a press fit dimension at both the first end portion and the second end portion in the axial direction, and formed with a hollow portion whose diameter is smaller than the pressed portions at a portion between the pressed portions.

14. The connection structure for the automatic transmission according to claim 3, wherein the portion facing the notch portion of the circular portion is an end face of the circular portion facing the notch portion.

* * * * *